United States Patent
Roy et al.

(10) Patent No.: US 11,463,134 B2
(45) Date of Patent: Oct. 4, 2022

(54) SECURE WI-FI COMMUNICATION BY PERTURBATION OF A SPATIAL MAPPING MATRIX

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/174,303

(22) Filed: Feb. 11, 2021

(65) Prior Publication Data

US 2022/0255590 A1    Aug. 11, 2022

(51) Int. Cl.
  *H04B 7/0408*  (2017.01)
  *H04B 7/06*  (2006.01)
  *H04L 1/00*  (2006.01)

(52) U.S. Cl.
  CPC ......... *H04B 7/0408* (2013.01); *H04B 7/0682* (2013.01); *H04L 1/0033* (2013.01)

(58) Field of Classification Search
  CPC .... H04B 7/0408; H04B 7/0682; H04L 1/0033
  See application file for complete search history.

(56) References Cited

U.S. PATENT DOCUMENTS

| | | | | |
|---|---|---|---|---|
| 7,570,210 B1* | 8/2009 | Nabar | ............... | H01Q 3/267 342/373 |
| 8,660,497 B1* | 2/2014 | Zhang | ............ | H04B 7/0619 455/63.1 |
| 2010/0248635 A1* | 9/2010 | Zhang | ............ | H04B 7/0697 455/63.1 |
| 2012/0062421 A1* | 3/2012 | Su | .................... | H04B 7/0634 342/373 |

(Continued)

FOREIGN PATENT DOCUMENTS

| | | |
|---|---|---|
| CN | 110213767 A | 9/2019 |
| EP | 3751753 A1 | 12/2020 |
| FR | 3029059 A1 | 5/2016 |

OTHER PUBLICATIONS

Shiu, Yi-Sheng et al. "Physical Layer Security in Wireless Networks: A Tutorial", IEEE Wireless Communications, Apr. 2011, pp. 66-74.

(Continued)

*Primary Examiner* — Janice N Tieu (57) ABSTRACT

Wi-Fi communication is further secured by perturbation of a spatial mapping matrix. In an embodiment channel state information is obtained from a receiving device in a wireless network through the wireless network. A first set of beam steering vectors is derived based on the channel state information to direct a radio signal to the receiving device. A second set of beam steering vectors is derived based on the channel state information to direct a radio signal other than to the receiving device. A perturbation matrix is generated.

(Continued)

A spatial mapping matrix is formed by combining the first and the second set of beam steering vectors with a perturbation matrix. Data symbols to be transmitted are pre-coded to the receiving device using the spatial mapping matrix and transmitted through the wireless network to the receiving device.

20 Claims, 3 Drawing Sheets

(56) References Cited

U.S. PATENT DOCUMENTS

2015/0023279 A1* 1/2015 Tomeba ............... H04L 5/0051
 370/329
2020/0204287 A1 6/2020 Sethi et al.

OTHER PUBLICATIONS

Sperandio, Chris et al. "Wireless Physical-Layer Security via Transmit Precoding over Dispersive Channels: Optimum Linear Eavesdropping", IEEE 2002, pp. 1113-1117.

* cited by examiner

SECURE WI-FI COMMUNICATION BY PERTURBATION OF A SPATIAL MAPPING MATRIX

BACKGROUND

Wi-Fi® communication has become a preferred worldwide standard for short distance data communications and is found in homes, offices, and public places. Many places offer free public Wi-Fi and some cities offer free Wi-Fi hot spot access. New wireless standards are being launched so that ever more data is being communicated over the air. However, all over-the-air communications technologies are, by nature, more susceptible to eavesdropping by intruders that are near the hot spot or the remote node. Such an intruder may be outside a home, near an office in a public area or a nearby suite, or in any other suitable place. This vulnerability is addressed by encrypting the data for the over-the-air channel.

Key based encryption techniques (WEP, WPA1, WPA2 etc.) work based on the assumption that the eavesdropper will capture transmitted data streams but will not be able to decrypt the data. The assumption relies on the eavesdropper having a limited amount of time and processing resources so that the eavesdropper is unable to guess the security key. WPA2 uses a 64 hexadecimal digit key. The assumption also relies on the eavesdropper not having obtained the key from either node through other surreptitious means. While these are good assumptions, they are not foolproof and encryption is not invulnerable. Other devices use simple encryption techniques in which symmetric keys are exchanged in the authentication phase. This technique is even less secure because keys can be easily sniffed during the exchange, leaving the data vulnerable.

SUMMARY

In embodiments, herein wireless signals, such as Wi-Fi communications, are further secured by perturbation of a spatial mapping matrix. In an embodiment, channel state information is obtained from a receiving device in a wireless network at a transmitting device. The channel state information is received through the wireless network. A first set of beam steering vectors is derived based on the channel state information to direct a first radio signal to the receiving device. A second set of beam steering vectors is derived based on the channel state information to direct a second radio signal other than to the receiving device. In embodiments, the second set of beam steering vectors is orthogonal to the first set of beam steering vectors. A perturbation matrix is generated, for example, in the form of a matrix. A spatial mapping matrix is formed by combining the first and the second set of beam steering vectors with a perturbation matrix. Data symbols to be transmitted are pre-coded to the receiving device using the spatial mapping matrix and transmitted through the wireless network to the receiving device.

In an embodiment, the channel state information comprises a channel coefficient matrix. In an embodiment, deriving a first and second set of beam steering vectors comprises applying a singular value decomposition to the channel coefficient matrix.

An embodiment further comprises sending a channel state information request to the receiving device and obtaining the channel state information comprises receiving the channel state information as feedback in response to the channel state information request.

In an embodiment, the perturbation matrix is configured as having a scalar selection factor chosen to be zero or one for each perturbation matrix value.

In an embodiment, the perturbation matrix is configured as having a scalar power factor for each perturbation matrix value. In an embodiment, the perturbation matrix values are random numbers within a range from zero to $2\pi$.

An embodiment further comprises changing the perturbation matrix after pre-coding each data symbol of the data symbols, wherein the data symbols are a sequency of data symbols. An embodiment further comprises forming a second spatial mapping matrix by combining the first and second set of beam steering vectors with a second perturbation matrix, pre-coding training symbols to be transmitted to the receiving device using the second spatial mapping matrix, and transmitting the pre-coded training symbols through the wireless network to the receiving device.

In an embodiment, the first perturbation matrix is different from the second perturbation matrix. An embodiment further comprises generating noise symbols, forming a second spatial mapping matrix using the first and second set of beam steering vectors, pre-coding the noise symbols using the second set of beam steering vectors, and transmitting the pre-coded noise symbols other than to the receiving device. In an embodiment, pre-coding the noise symbols further comprises selecting different beam steering vectors of the second set of beam steering vectors after pre-coding each noise symbol.

Some embodiments pertain to a computer-readable medium having instructions stored thereon that when operated on by the computer cause the computer to perform operations comprising obtaining channel state information from a receiving device in a wireless network at a transmitting device, the channel state information being received through the wireless network, deriving a first set of beam steering vectors based on the channel state information to direct a first radio signal to the receiving device, deriving a second set of beam steering vectors based on the channel state information to direct a second radio signal other than to the receiving device, wherein the second set of beam steering vectors is orthogonal to the first set of beam steering vectors, generating a perturbation matrix, forming a spatial mapping matrix by combining the first and the second set of beam steering vectors with the perturbation matrix, pre-coding data symbols to be transmitted to the receiving device using the spatial mapping matrix, and transmitting the pre-coded data symbols through the wireless network to the receiving device.

In some embodiments deriving a set of beam steering vectors comprises applying a singular value decomposition to the channel state information in the form of a channel coefficient matrix. Ins some embodiments, the perturbation matrix has a scalar selection factor chosen to be zero or one for each perturbation matrix value and a scalar power factor for each perturbation matrix value.

Some embodiments pertain to an apparatus comprising a controller to obtain channel state information from a receiving device in a wireless network through the wireless network, to derive a first set of beam steering vectors based on the channel state information to direct a first radio signal to the receiving device, to derive a second set of beam steering vectors based on the channel state information to direct a second radio signal other than to the receiving device, wherein the second set of beam steering vectors is orthogonal to the first set of beam steering vectors, to generate a perturbation matrix, and to form a spatial mapping matrix by combining the first and the second set of beam steering vectors with the perturbation matrix, and a transceiver to pre-code data symbols to be transmitted to the receiving device using the spatial mapping matrix, and transmit the pre-coded data symbols through the wireless network to the receiving device.

In some embodiments, the controller is further to form a second spatial mapping matrix by combining the first and the second set of beam steering vectors with a second perturbation matrix and wherein the transceiver is further to pre-code training symbols to be transmitted to the receiving device using the second spatial mapping matrix and transmit the pre-coded training symbols through the wireless network to the receiving device.

In some embodiments, the perturbation matrix has a scalar selection factor chosen to be zero or one for each perturbation matrix value.

In some embodiments, the controller is further to generate noise symbols and form a second spatial mapping matrix using the first and second set of beam steering vectors and wherein the transceiver is further to pre-code the noise symbols using the second spatial mapping matrix and transmit the pre-coded noise symbols other than to the receiving device.

In some embodiments, pre-coding the noise symbols further comprises selecting different beam steering vectors of the second set of beam steering vectors after pre-coding each noise symbol.

BRIEF DESCRIPTION OF THE DRAWINGS

Throughout the description, similar reference numbers may be used to identify similar elements.

DETAILED DESCRIPTION

It will be readily understood that the components of the embodiments, as generally described herein and illustrated in the appended figures, could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Many wireless transmitting devices use beamforming at the physical layer for many data communications. A beamforming system uses multiple antenna (often referred to as multiple antenna elements of a single antenna) separated by a known distance to direct the transmitted radio energy in one or more particular directions. The directed radio energy is referred to as a beam. The beam is formed by controlling the phase of the radio signal at each antenna. For a two-antenna system, the two radio signals, each from a different antenna emanate from a different position, determined by the position of the respective antenna, and interfere with each other. Where the interference is constructive, the combined radio signal is stronger. Where the interference is destructive, the combined radio signal is weaker. More antennas and more physical separation increase the precision with which the formed beam may be steered.

Figure 1:
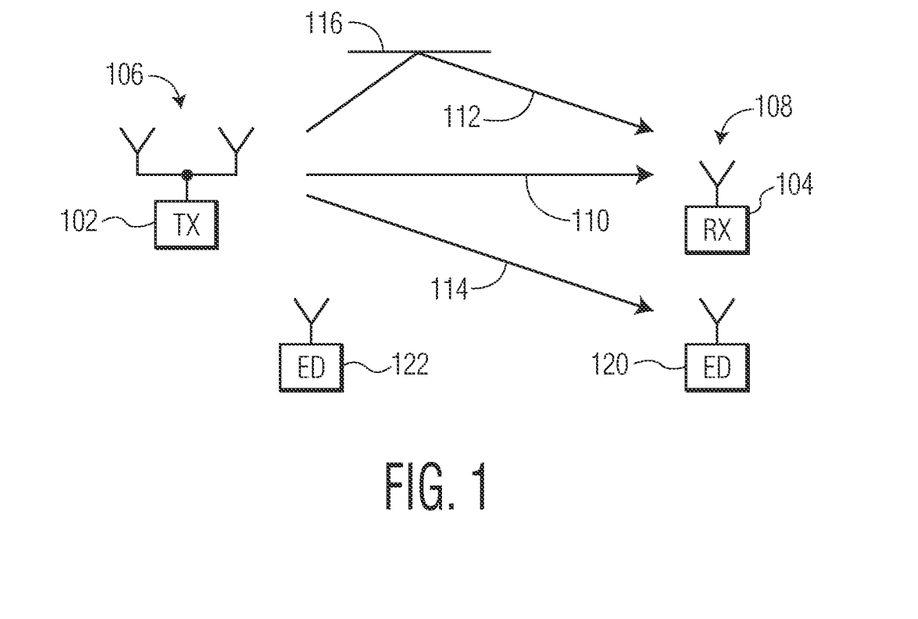
FIG. 1 is a simplified diagram of wireless network with beam steering and eavesdroppers.

FIG. 1 is a simplified diagram of a wireless network. A transmitting device (TX) 102 directs a radio signal 110 to a receiving device (RX) 104. The transmitting device 102 and the receiving device 104 may be access points (AP), routers, stations (STA), clients or any other node on the network. The terms "transmitting device" and "receiving device" refer to the illustrated function. Before or after the transmission, the function may be reversed so that the receiving device is responding with a transmission back to the transmitting device. The transmitting device 102 has an antenna array 106 with two or more antenna elements to steer radio signals toward or away from the receiving device 104 as steered beams. As shown, there may be one or more direct radio signals 110 to the receiving device 104 and one or more reflected radio signals 112 to the receiving device. The reflected radio signals 112 may be reflected by a wall 116 or other vertical surface or by other environmental conditions. One or more of these beams are received at one or more antenna elements 108 of the receiving device 104.

A first eavesdropper 120 may be located near the receiving device 104 in order to also capture the direct 110 or reflected radio signals 112 to the receiving device 104. The first eavesdropper may be close enough to be within one of the beams or positioned to receive a reflection of one or more of the beams. As described below, in some embodiments, the transmitting device 102 directs a noise beam 114 to the first eavesdropper that obscures the reception of either of the radio signals 110, 112. A second eavesdropper 122 may be located away from the directed 110 and reflected radio signals 112 in order to capture other radio signals. The second eavesdropper may be outside of the range of the noise radio signal 114 to allow it to capture a reflected radio signal without the noise.

Techniques described herein make it more difficult for an eavesdropper to receive data communications by using beamforming to reduce the strength of the data signal and increase the amount of noise directed at the eavesdropper. This improves the security of the communications link. The techniques described herein are low complexity and may be done mostly using existing Wi-Fi transmitter capabilities. The data signal is greatly suppressed for eavesdroppers. The technique may be used by many different multiple antenna wireless devices, including Wi-Fi chips, and in many different locations including homes, meeting rooms, airports, motor vehicles, etc.

Figure 2:
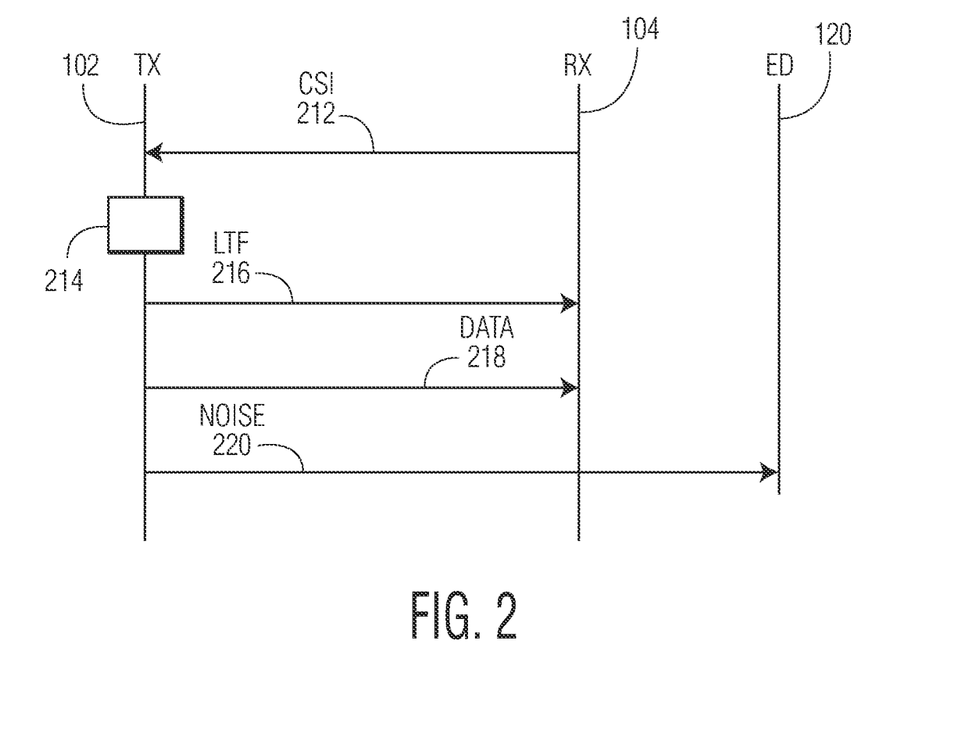
FIG. 2 is a signal diagram of physical layer signals between a transmitting device and a receiving device in a wireless network.

The described techniques may be operated in the physical layer. FIG. 2 is a signal diagram of physical layer signals between the transmitting device 102 and the receiving device 104. The transmitting device 102 obtains channel state information (CSI) from the receiving device 104. In the diagram, the receiving device 104 sends a CSI message 212 to the transmitting device 102. Depending on the protocols and implementation, the CSI may be sent in response to a request, based on a periodic timer, in association with other data or in other ways.

The transmitting device 102 uses the CSI to form 214 a spatial mapping matrix. In some embodiments, two different, spatial mapping matrices are formed. The first spatial mapping matrix is applied to the training symbols, and the second spatial mapping matrix is applied to the data. In some embodiments, the training field is a Long Training Field (LTF) or a Short Training Field (STF). The present description is presented in the context of LTF, however, similar techniques and structures may be applied to other training configurations and structures. The data, as used herein, refers to the payload that is received with the help of the training. Accordingly, the data may be control, configuration, or management information, routing information, status information, user data, or a combination of different types of information.

The transmitting device 102 sends a training signal 216 using the first spatial mapping matrix and a data signal 218 using the second spatial mapping matrix. This introduces incoherence between channel estimates based on the training signal 216 and the actual channel of the data signal 218, making equalization difficult for an eavesdropper 120, 122. The spatial mapping matrices are designed in such a way that they allow channel equalization using training fields only for the intended user. In some embodiments, the spatial mapping matrices are formed, in part, using a singular value decomposition which is already supported by many devices capable of beamforming. As a result, the additional cost of implementation is low. In some embodiments, the transmitting device 102 also sends a noise signal 220 using another spatial mapping matrix in directions other than to the receiving device 104. This signal may include eavesdroppers 120.

In embodiments, as described herein, an additional level of security is provided to wireless transmissions. The described techniques and systems may be applied to any wireless communications interface that uses spatial spreading. Further security is added for systems with separate training and data by treating the training and data differently.

Figure 3:
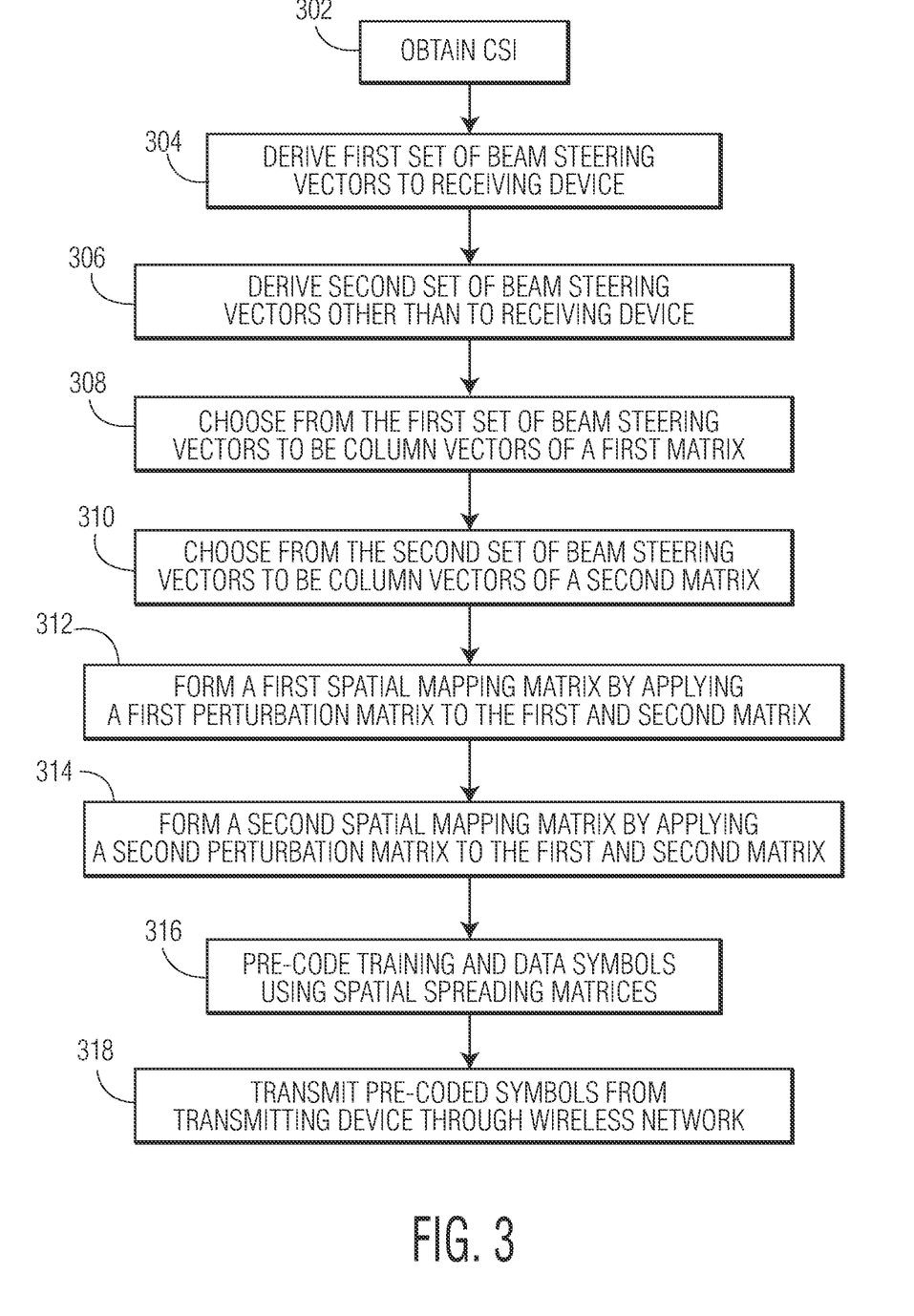
FIG. 3 is a process flow diagram for adding physical layer security to beam steered wireless communication transmission.

FIG. 3 is a process flow diagram for adding physical layer security to beam steered wireless communication transmission. To begin the operations, the transmitting device 102 obtains 302 channel state information (e.g., the H matrix) from a client device, such as a receiving device 104. The channel state information may be obtained implicitly or through feedback.

In some embodiments, the transmitting device 102 uses the H matrix to derive a first set of one or multiple orthogonal beam steering vectors (e.g., $v_1, v_2, \ldots, v_k$) that have significant power in the direction of the client at operation 304 and a second set of orthogonal beam steering vectors (e.g., $n_1, n_2, \ldots, n_r$) that have little or no power in the direction of the client at operation 306. Singular value decomposition (SVD), for example, may be used to compute both the first and the second sets of beam steering vectors.

The transmitting device then forms a spatial mapping matrix at operation 312 for training symbols $Q_{LTF}$ and at operation 314 a second different spatial mapping matrix for data symbols $Q_{DATA}$. A sum of one beam steering vector matrix with a product of a perturbation matrix with another beam steering vector matrix may be used to compute the spatial mapping matrix. Two different perturbation matrices may be generated, one for the training symbols $A_{LTF}$ and another for the data symbols $A_{DATA}$. In some embodiments, training symbols and data symbols are treated the same and there is only one spatial mapping matrix Q and one perturbation matrix A. Such a simplified approach still provides significant protection against most eavesdroppers. The perturbation matrices may be generated with elements that are adapted to suit different implementations. In some embodiments, each element includes a random or pseudo-random number, $\theta_{i,j}$, having a value between 0 and $2\pi$, a selection factor, $\xi_{i,j}$, having a value chosen from the set $\{0,1\}$, and a power scaling factor p for power control.

The transmitting device 102 then pre-codes (i.e., pre-multiplies) the LTF symbol sequence at operation 316 using the training spatial mapping matrix $Q_{LTF}$, and pre-codes the data symbol sequence using the data spatial mapping matrix $Q_{DATA}$. The pre-coded training and data symbols, representing the training signal 216 and the data signal 218 are then transmitted at operation 318 from the transmitting device's 102 antenna array 106.

The impact on the eavesdropper 120, 122 is first that the data sequence has very low received signal strength and, if noise is transmitted as a noise signal 220 on the second set of beam steering vectors, then the noise sequence has a much higher received signal strength. Second, generating different perturbation matrices for training and data, inhibits the eavesdropper because the channel coefficients received on the LTF are not suitable to equalize the data.

Considering the operation of FIG. 3 in more detail, the development of the new spatial mapping matrices may be understood, in some embodiments as beginning with the transmitting device obtaining CSI from the receiving device. In some embodiments, this is referred to as the H matrix. The H matrix may be obtained implicitly or through feedback. While embodiments are described in the context of an H matrix, the CSI may be received in any of a variety of other formats. The CSI describes the current conditions of the wireless channel between the transmitter and receiver. The H matrix is a channel coefficient matrix that includes the attenuation and phase shift experienced by each spatial stream at each receive antenna in each of the subcarriers, such as OFDM (Orthogonal Frequency Division Multiplexing) subcarriers in the IEEE 802.11n specification. In IEEE 802.11n, a receiver generates the CSI by analyzing received packets using training sequences in the packet headers.

The CSI between a transmitting device and a receiving device may alternatively take a variety of other forms. In the example below the H matrix has dimensions of $N_{RX} \times N_{TX}$, Where $N_{RX}$ is a number of antennas of the receiving device and NIX is a number of antennas of the transmitting device. $N_{SS}$ is a number of spatial streams transmitted from the transmitting device to the receiving device.

The transmitting device 102 then uses the H matrix to derive one or multiple orthogonal vectors (e.g. $v_1, v_2, \ldots, v_k$) that have significant power in the direction of the client, such as the receiving device 104 and another set of orthogonal vectors (e.g. $n_1, n_2, \ldots, n_r$) that do not have significant power in the direction of the receiving device 104. In embodiments, the second set of vectors is also orthogonal to the first set of vectors. Singular value decomposition (SVD) may be used, for example, to compute both sets of vectors described above An example of using SVD is to choose a set of $N_{SS}$ vectors from the first set and denote the matrix composed of these column vectors by $V=[v_1, v_2, \ldots, v_{NSS}]$ and the matrix composed of the second set of vectors as column vectors by $N=[n_1, n_2, \ldots, n_r]$, where N consists of all vectors in the null space of H and hence $r=N_{TX}-N_{RX}$. In FIG. 3, this is an operation 308 of choosing from the first set of beam steering vectors to be column vectors for a first matrix and an operation 310 of choosing from the second set of beam steering vectors to be column vectors for a second matrix.

A Singular Value Decomposition (SVD) for an H matrix is given as $H=L\Lambda R^H$, where L and R are unitary matrices (known as the left and right singular vector matrices respectively) and $R^H$ denotes the Hermitian transpose of the R matrix. This decomposition for the channel coefficient matrix H can be obtained by signal processing algorithms.

An example is provided below in which $N_{TX}=4$ and $N_{TX}=2$ and H is received with values as follows:

$$H = \begin{bmatrix} 1.5442 - 0.1924i & -1.4916 - 0.7648i & -1.0616 - 14224i & -0.6156 - 0.1774i \\ 0.0859 + 0.8886i & -0.7423 - 1.4023i & 2.3505 + 0.4882i & 0.7481 - 0.1961i \end{bmatrix} \quad \text{Eq. 1}$$

Then, it can be verified that:

$$L = \begin{bmatrix} -0.6814 & -0.7319 \\ 0.1749 - 0.7107i & -0.1628 + 0.6617i \end{bmatrix} \quad \text{Eq. 2}$$

$$\Lambda = \begin{bmatrix} 3.9267 & 0 & 0 & 0 \\ 0 & 1.7459 & 0 & 0 \end{bmatrix} \quad \text{Eq. 3}$$

$$R = \begin{bmatrix} -0.4250 - 0.0885i & -0.3186 + 0.0348i & 0.4186 + 0.6735i & 0.2561 + 0.1203i \\ 0.4796 + 0.0641i & 0.1631 - 0.7327i & 0.4089 + 0.1126i & 0.1498 + 0.0127i \\ 0.2005 - 0.6940i & 0.4109 + 0.3400i & 0.3781 + 0.0317i & -0.1946 + 0.1090i \\ 0.1756 - 0.1574i & 0.1140 + 0.1909i & -0.1963 - 0.0941i & 0.9206 + 0.0011i \end{bmatrix} \quad \text{Eq. 4}$$

Two cases may be considered as examples to illustrate the application of the SVD as $H=L\Lambda R^H$:

Case 1: Suppose, only one stream is to be transmitted. So, $N_{SS}=1$. The first column of the R matrix may be selected as V. In such a case, $$V = \begin{bmatrix} -0.4250 - 0.0885i \\ 0.4796 + 0.0641i \\ 0.2005 - 0.6940i \\ 0.1756 - 0.1574i \end{bmatrix} \quad \text{Eq. 5}$$

Case 2: Suppose, two streams are to be transmitted. So, $N_{SS}=2$. The first two column of the R matrix may be selected as V. In such a case $$V = \begin{bmatrix} -0.4250 - 0.0885i & -0.3186 + 0.0348i \\ 0.4796 + 0.0641i & 0.1631 - 0.7327i \\ 0.2005 - 0.6940i & 0.4109 + 0.3400i \\ 0.1756 - 0.1574i & 0.1140 + 0.1909i \end{bmatrix} \quad \text{Eq. 6}$$

Notice that, at the intended receiving device, the power of the stream sent along the first column of the R matrix is received with the highest power. In particular notice that $$\|Hv_1\| = \left\| \begin{bmatrix} 1.5442 - 0.1924i & -1.4916 - 0.7648i & -1.0616 - 1.4224i & -0.6156 - 0.1774i \\ 0.0859 + 0.8886i & -0.7423 - 1.4023i & 2.3505 + 0.4882i & 0.7481 - 0.1961i \end{bmatrix} \right. \quad \text{Eq. 7}$$

$$\left. \begin{bmatrix} -0.4250 - 0.0885i \\ 0.4796 + 0.0641i \\ 0.2005 - 0.6940i \\ 0.1756 - 0.1574i \end{bmatrix} \right\| = 3.9267$$

i.e. a unit signal sent along the vector $v_1$ is received with a power of $3.9267^2$ (which is precisely the square of the first singular value).

Similarly, it can be verified that a unit signal sent along the second vector of R i.e.

$$v_2 = \begin{bmatrix} -0.3186 + 0.0348i \\ 0.1631 - 0.7327i \\ 0.4109 + 0.3400i \\ 0.1140 + 0.1909i \end{bmatrix} \quad \text{Eq. 8}$$

is received with a power of $1.7459^2$ (i.e. the square of the second singular value)

On the same basis, signals sent along the third and fourth vectors of R are received with 0 power (since the corresponding singular value is 0). The third and fourth vectors of the R matrix spans the null space of H. Thus in this case the dimension of the Null space of H is 2. In general, for a P×Q matrix with P<Q of rank P, it can be shown that the dimension of the null space of H is Q–P.

In sum, for a $N_{Rx} \times N_{Tx}$ matrix H with $N_{Rx} < N_{Tx}$, the right singular vector matrix will be of dimension $N_{Tx} \times N_{Tx}$ out of which the first $N_{Rx}$ vectors will correspond to non-zero singular values, and will be used to construct the V matrix, and the remaining $N_{Tx} - N_{Rx}$ vectors correspond to zero singular values and will be used to construct the N matrix.

Using the V and N matrices, spatial spreading matrices Q may be formed by combining the V and N matrices with perturbation matrices A. V and N represent characteristics of the wireless channel between the transmitter and receiver. As mentioned above, in some embodiments, these characteristics are generated based on measurements of training data measured by the receiving device. These characteristics of the wireless channel will be the same for training symbols as well as for data symbols because the training symbols are intended to be used to receiver the data symbols. In some embodiments, the spatial spreading matrix Q is the same for both training symbols and for data symbols. This may be accomplished by using the same perturbation matrix A for both the training symbols and the data symbols.

In other embodiments, two different perturbation matrices, $A_{LTF}$ for training symbols and $A_{DATA}$ for data symbols, are generated in order to form two different spatial spreading matrices. At operation 312, a first spatial spreading matrix $Q_{LTF}$ is formed for training symbols and at operation 314 a second spatial spreading matrix $Q_{DATA}$ is formed for data symbols. In some embodiments, $Q_{LTF} = V + N \times A_{LTF}$ and $Q_{Data} = V + N \times A_{Data}$ where $A_{LTF}$ and $A_{Data}$ are perturbation matrices. The perturbation matrices may be generated in any of a variety of different ways. In some embodiments they are random matrices of the form:

$$p \begin{bmatrix} \xi_1 \exp(j\theta_{1,1}) & \cdots & \xi_1 \exp(j\theta_{1,N_{SS}}) \\ \vdots & \ddots & \vdots \\ \xi_{N_{Tx}-N_{Rx}} \exp(j\theta_{N_{Tx}-N_{Rx},1}) & \cdots & \xi_{N_{Tx}-N_{Rx}} \exp(j\theta_{N_{Tx}-N_{Rx},N_{SS}}) \end{bmatrix} \quad \text{Eq. 9}$$

where $\theta_{i,j}$ are random (or pseudo random numbers) between 0 and $2\pi$. $\xi_1, \ldots, \xi_{N_{Tx}-N_{Rx}}$ are numbers chosen from the set {0,1} used for selecting rows of the above matrix. These factors provide the flexibility to choose any number of columns of the N matrix. p is a scalar used to scale all of the values for power control. This scalar, p, can be used to control the relative power transmitted in the signal V and interference N components.

The random numbers $\theta_{i,j}$ for LTF symbols may be different from those for data. Moreover, those applied on the data may be changed on a symbol-by-symbol basis. This provides an additional layer of security. These random numbers may be generated in any of a variety of different ways. In some embodiments, the random numbers $\theta_{i,j}$ for both LTF and data may be generated pseudo-randomly using, for example, a LFSR (Linear Feedback Shift Register).

The factors $\xi_1, \ldots, \xi_{N_{Tx}-N_{Rx}}$ may or may not be different for LTF and data and may or may not be changed on a symbol-by-symbol basis depending on the particular implementations.

The dimensions of the above-mentioned matrices may be respectively:

$$(Q_{LTF/Data})_{N_{Tx}, N_{SS}}, (V)_{N_{Tx}, N_{SS}}, (N)_{N_{Tx}, N_{Tx}-N_{Rx}}$$
$$(A_{LTF/Data})_{N_{Tx}-N_{Rx}, N_{SS}} \quad \text{Eq. 10}$$

Using the respective spatial spreading matrices, the training and data symbols are pre-coded at operation 316. The pre-coding may take any of a variety of different forms. Using current hardware and processes, the symbols are pre-coded by multiplying the LTF sequence with the spatial spreading matrix $Q_{LTF}$ for the training sequence. Similarly, the data sequence is multiplied with the spatial spreading matrix $Q_{Data}$ for the data sequence.

The pre-coded symbols may then be transmitted at operation 318 from the transmitting device through the wireless network. The symbols pre-coded with the V components are directed to the receiving device. The symbols pre-coded with the N components are directed other than to the receiving device. In many circumstances, the symbols pre-coded with the N components will be the strongest signal that will be received by an eavesdropper.

Figure 4:
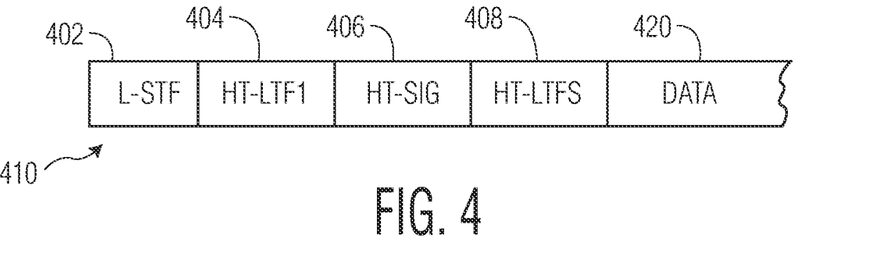
FIG. 4 is a diagram of a wireless packet suitable for use in a wireless network.

FIG. 4 is a diagram of a wireless packet 410 that may be transmitted through the wireless network in an 802.11n communications system. While examples are presented in the context of 802.11n, the same principles, techniques and structures may be applied to other wireless networking and communications standards including 802.11n/ac/ax/be, Bluetooth, cellular and other types of wireless networking and communications. The packet may have more or fewer fields to support legacy or new operational modes. The ordering of the fields may also be modified to suit different implementations. The techniques and structures described herein may also be applied to other packet structures not shown herein. The packet begins with a legacy short training field (L-STF) 402. This field includes training symbols that may be received and demodulated by legacy devices. Other devices may also train on this field. The L-STF 402 is followed by a first high throughput long training field (HT-LTF1) 404. This field may be used for training high throughput data. A high throughput signal field (HT-SIG) 406 follows the first HT-LTF1 which is then followed by additional HT-LTFs 408. These are then followed by the data field 408. The data field may contain service data, user data, padding bits, tail bits, and any other data that is to be sent from the transmitter to the receiving device.

As described above, each of the fields of the wireless packet 410 may be pre-coded using the same spatial mapping matrix or training fields may be pre-coded using a different spatial mapping matrix from the data field. The different spatial mapping matrices may be formed by combining beam steering vectors with different perturbation matrices. To direct a radio signal to the receiving device, the same set of beam steering vectors may be used to form both vectors. In embodiments using two different spatial mapping matrices, it is sufficient that the first spatial mapping matrix be applied to either one of the LTF fields, HT-LTF1 404 or HT-LTFs 408. In some embodiments, all of the training fields including the HT-SIG 406 are pre-coded with one or more spatial mapping matrices and the data field is pre-coded with a different spatial mapping matrix.

In addition to the perturbation matrix being used when pre-coding the training and the data to the receiving device, noise symbols may be generated and sent through the wireless network other than to the receiving device. The noise signal may be random, pseudorandom or in accordance with another pattern that is difficult to filter out of a radio signal. Beam steering may be applied to the noise by pre-coding the noise symbols with a spatial mapping matrix that is formed using the beam steering vectors. The spatial mapping matrix may be formed with or without a perturbation matrix. The perturbation matrix for the training or the data or a different perturbation matrix may be used.

The security added to the physical layer by the perturbation matrices does not require any modification to the receiving device. The receiving device may transmit CSI in accordance with the relevant wireless standard such as 802.11n or a cellular standard. The receiving device then receives the training symbols and trains on these symbols to allow it to receive the data symbols. For the eavesdropper, however, it is very difficult to accurately receive the data symbols.

As an example, for the receiving device, consider the case described above in which $N_{Tx}=4$, $N_{Rx}=2$, $N_{ss}=2$. For the LTF, the net received channel coefficient matrix is $$H_{LTF} = H \times Q_{LTF} = L\Lambda R^H(V + N \times A_{LTF}) = \qquad \text{Eq. 11}$$

$$L\Lambda R^H V + L\Lambda R^H N A_{LTF} = L\begin{bmatrix} \sigma_1 & 0 & 0 & 0 \\ 0 & \sigma_2 & 0 & 0 \end{bmatrix}\begin{bmatrix} r_1^H \\ r_2^H \\ r_3^H \\ r_4^H \end{bmatrix}[r_1 \ r_2] +$$

$$L\begin{bmatrix} \sigma_1 & 0 & 0 & 0 \\ 0 & \sigma_2 & 0 & 0 \end{bmatrix}\begin{bmatrix} r_1^H \\ r_2^H \\ r_3^H \\ r_4^H \end{bmatrix}[r_3 \ r_4]A_{LTF} =$$

$$L\begin{bmatrix} \sigma_1 & 0 & 0 & 0 \\ 0 & \sigma_2 & 0 & 0 \end{bmatrix}\begin{bmatrix} \|r_1\|^2 & r_1^H r_2 \\ r_2^H r_1 & \|r_2\|^2 \\ r_3^H r_1 & r_3^H r_2 \\ r_4^H r_1 & r_3^H r_2 \end{bmatrix} +$$

$$L\begin{bmatrix} \sigma_1 & 0 & 0 & 0 \\ 0 & \sigma_2 & 0 & 0 \end{bmatrix}\begin{bmatrix} r_1^H r_3 & r_1^H r_4 \\ r_2^H r_3 & r_2^H r_4 \\ \|r_3\|^2 & r_3^H r_4 \\ r_4^H r_3 & \|r_4\|^2 \end{bmatrix}A_{LTF} = L\begin{bmatrix} \sigma_1 & 0 & 0 & 0 \\ 0 & \sigma_2 & 0 & 0 \end{bmatrix}\begin{bmatrix} 1 & 0 \\ 0 & 1 \\ 0 & 0 \\ 0 & 0 \end{bmatrix} +$$

$$L\begin{bmatrix} \sigma_1 & 0 & 0 & 0 \\ 0 & \sigma_2 & 0 & 0 \end{bmatrix}\begin{bmatrix} 0 & 0 \\ 0 & 0 \\ 1 & 0 \\ 0 & 1 \end{bmatrix}A_{LTF}L\begin{bmatrix} \sigma_1 & 0 \\ 0 & \sigma_2 \end{bmatrix} +$$

$$L\begin{bmatrix} 0 & 0 \\ 0 & 0 \end{bmatrix}A_{LTF} = L\begin{bmatrix} \sigma_1 & 0 \\ 0 & \sigma_2 \end{bmatrix}$$

Here, $r_i$'s are the columns of a unitary matrix and hence $\|r_i\|^2=1$, $\forall i$ and $r_i^H r_j=0$, when $i \neq j$ Similarly, the data vector $Q_{Data}x_{Data}$ is received as $$H \times Q_{Data}x_{Data} = L\begin{bmatrix} \sigma_1 & 0 \\ 0 & \sigma_2 \end{bmatrix}x_{Data} \qquad \text{Eq. 12}$$

Thus the channel estimate matrix $$H_{LTF} = L\begin{bmatrix} \sigma_1 & 0 \\ 0 & \sigma_2 \end{bmatrix}$$

can be used to equalize the received data vector $$L\begin{bmatrix} \sigma_1 & 0 \\ 0 & \sigma_2 \end{bmatrix}x_{Data}.$$

On the other hand, the channel coefficient matrix at the eavesdropper can be decomposed as $H_{eav}=L_{ev}\Lambda_{ev}R_{ev}^H$. However now, the $R_{ev}$ matrix is not matched to the V and N matrices that are used to precode the LTF and data. So now, V does not maximize signal reception at the eavesdropper's receiver and also $H_{eav}N \neq 0$ Hence $H_{eav}Q_{LTF} =$ Eq. 13

$$H_{eav}V + H_{eav}N \times A_{LTF} \neq H_{eav}V + H_{eav}N \times A_{Data} = H_{eav}Q_{Data}$$

So, the eavesdropper cannot use the channel coefficients received on the LTF to equalize the data exactly.

In some embodiments, noise may be transmitted in the directions of the columns of the N matrix. As an example, this may be done using the following appended matrix as the spatial spreading matrix during both training field transmission as well as data transmission:

$Q=[V \ \hat{N}]$, where $\hat{N}$ is the matrix formed by selecting any number of columns from the N matrix. Any desired number and combination of the columns may be used because there is no data to be transmitted. Fewer columns may be used to reduce overall system noise when there is other traffic on the wireless network.

In this example, the following vectors are transmitted during the transmission of the LTF symbols and the data symbols respectively:

$$\text{LTF: } Q \times [x_{LTF}, n_{1,L}, \ldots, n_{m,L}] \qquad \text{Eq. 14}$$

$$\text{Data: } Q \times [x_{Data}, n_{1,D}, \ldots, n_{m,D}]^T \qquad \text{Eq. 15}$$

where m is the number of columns in the $\hat{N}$ matrix. $n_{1,L}, \ldots, n_{m,L}$ are noise samples transmitted during LTF and $n_{i,D}, \ldots, n_{m,D}$ are noise samples transmitted during data. These noise samples may be drawn from any distribution and then scaled appropriately for maintaining the same transmitted power level between the LTF and the data symbols.

When noise is being transmitted, the received LTF symbol for the intended user may be stated as:

$$HQ\begin{bmatrix} x_{LTF} \\ n_L \end{bmatrix} = \qquad \text{Eq. 16}$$

$$H[V\hat{N}]\begin{bmatrix} x_{LTF} \\ n_L \end{bmatrix} = H(Vx_{LTF} + \hat{N}n_L) = HVx_{LTF} + H\hat{N}n_L = HVx_{LTF}$$

(since $H\hat{N} = 0$)

This may be compared to the previous setup in which the received symbol during LTF for the intended user may be expressed as:

$$HQ_{LTF}x_{LTF}=H(V+N \times A_{LTF})x_{LTF}=HVx_{LTF}+ \\ HNA_{LTF}x_{LTF}=HVx_{LTF} \qquad \text{Eq. 17}$$

(since HN=0)

As a result, the received LTF symbols are identical under both setups.

On the other hand, for the eavesdropper, under the new setup, the received symbol during LTF may be stated as:

$$H_{ev}Q\begin{bmatrix} x_{LTF} \\ n_L \end{bmatrix} = HVx_{LTF} + H\hat{N}n_L \qquad \text{Eq. 18}$$

Under the previous setup, this is expressed as $$H_{ev}Q_{LTF}x_{LTF}=HVx_{LTF}+HNA_{LTF}x_{LTF} \qquad \text{Eq. 19}$$

The first part (i.e. $HVx_{LTF}$) is identical under both setups. Also both $\hat{N}n_L$ and $NA_{LTF}x_{LTF}$ produce vectors in the column space of the matrix N. Hence by appropriately choosing $A_{LTF}$, $H\hat{N}n_L$ and $HNA_{LTF}x_{LTF}$ can be driven to be statistically similar.

While the expressions above describe the received training symbols, the received data symbols are similarly affected.

In still further embodiments, the noise may be generated by drawing $n_{1,L}, \ldots, n_{m,L}$ randomly from the set $\{+1, -1\}$ and also drawing $n_{1,D}, \ldots, n_{m,D}$ randomly from the constellation of the data. This implementation has reduced complexity compared to generating the determinative values but at the same time automatically ensures power balance between the LTF symbols and the data symbols.

In further embodiments, different spatial spreading matrices may be used for the LTF symbols and the data symbols such that, for example: $Q_{LTF}=[V \ \widehat{N}_L]$ and $Q_{Data}=[V \ \widehat{N}_D]$ where $\widehat{N}_L$ and $\widehat{N}_D$ may contain different subsets of columns of the N matrix. This gives more diversity in the null space in which noise is directed to possible eavesdroppers.

In further embodiments $\widehat{N}_D$ may be changed on a symbol-by-symbol basis by choosing different subsets of columns of the N matrix. this provides still more diversity in the null space. In addition, the same or different numbers of columns may be chosen for $\widehat{N}_L$ and $\widehat{N}_D$ between data symbols.

Figure 5:
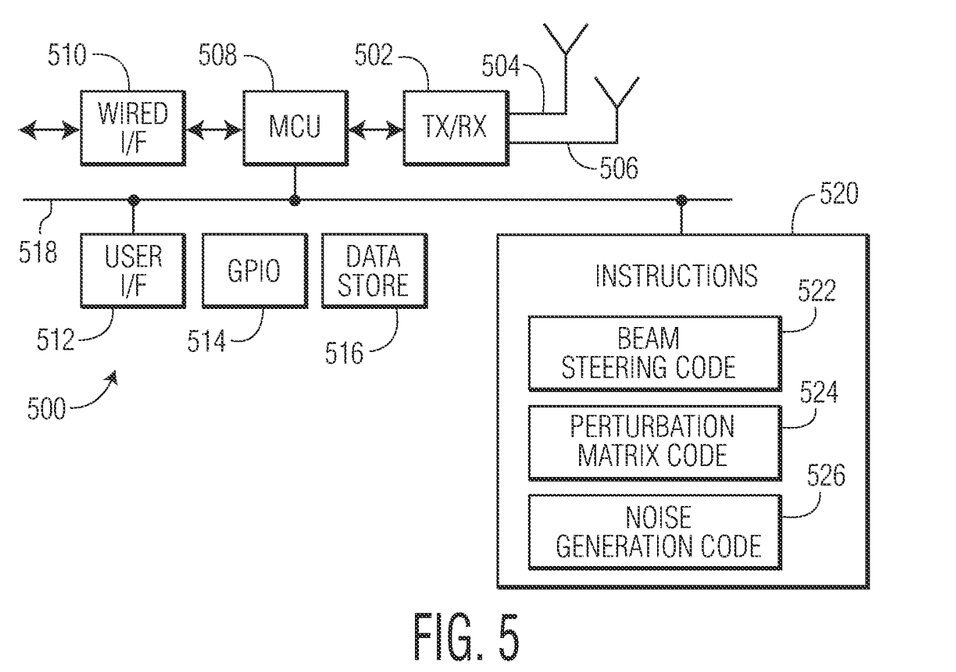
FIG. 5 is high-level block diagram of a wireless networking node.

FIG. 5 is a high-level block diagram of a wireless networking node 500, such as a Wi-Fi AP or STA, or any other node in a hub-based or peer-to-peer wireless network with beam forming. The networking node 500 may operate as the transmitting device and the receiving device as described above. It may also be configured to interface with external devices, such as data routers, computers, end and edge devices, things, etc. A transceiver module 502 including a transmit chain and receive chain with suitable radio frequency components is coupled to an antenna array with two or more antenna elements 504, 506. The transceiver module sends and receives data through the antennas to interface with other nodes on the wireless network. The transceiver module is coupled to a microcontroller (MCU) 508 or other controller or processor which is optionally coupled to a wired interface 510.

The wired interface may be connected to controllers, peripheral devices, and other nodes on a wired network for communication using Ethernet, USB (Universal Serial Bus) and any additional or other wired communications interface. The wired interface may be configured to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth network, or other network.

The MCU 508 includes processing cores, memory, data buffers, and data storage. The MCU 508 is coupled to a variety of different interfaces and resources which may be internal to the MCU or coupled through an external bus 518, as shown, or a combination of both. These interfaces and resources may include a user interface 512, which may be wired or wireless, a general purpose input/output interface 514 and a data store 516 for configuration registers, user data, and other data. The resources may also include an instruction store 520 which may be integrated with the data store 516 or independent of the data store 516. The data 516 and instruction stores 520 may include a variety of transitory and non-transitory computer-readable media such as volatile memory, non-volatile memory, removable storage, and non-removable storage. This storage may be in the form of, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data.

The instructions store 520 includes computer-readable instructions for use by the MCU or other processing resources of the networking node 500, for example, program code in an application module, and can include or be representative of software routines, software subroutines, software objects, etc. suitable for operations described herein. These instructions may include computer code such as networking code, protocol code, beacon code, authentication code, and router code.

In particular, the instructions may include beam steering code 522 to derive beam steering vectors using channel state information and other data and to combine the beam steering vectors with other information to form spatial mapping matrices for use by the transceiver module 502. The instructions may also include perturbation matrix code 524 to generate perturbation matrices and noise generation code 526 to generate elements for a perturbation matrix and to generate symbols to send other than to the receiving device among other uses.

Figure 6:
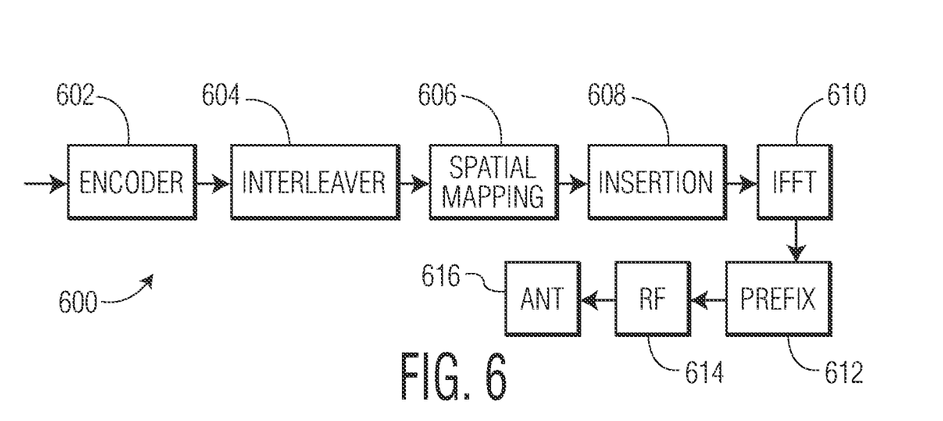
FIG. 6 is a block diagram of a transmit chain of a transceiver module.

FIG. 6 is a block diagram of a transmit chain 600 of the transceiver module 502. The transceiver module 502 also has a receive chain which performs similar operations in the reverse order. The transmit chain 600 includes an encoder 602 to receive training, data, and noise symbols from the MCU 508 or another source and encode them using a forward error correction code such as Reed-Solomon or parity codes. The encoder is coupled to an interleaver 604. the interleaver is coupled to a spatial mapping module 606 to pre-code the interleaved symbols using a spatial mapping matrix. The spatial mapping module 606 is coupled to an insertion module 608 to insert pilot symbols and other symbols. The insertion module 608 is coupled to an inverse fast Fourier transform (IFFT) 610 to transform the symbols into the time domain. The IFFT 610 is coupled to a cyclic prefix insertion module 612 to insert guard intervals and other structures. The cyclic prefix insertion module is coupled to an RF module 614 for radio frequency modulation and amplification which is coupled to the antenna array 616. The transmit chain may include other or additional components to suit a particular wireless transmission format, including a scrambler to transpose, invert or encode a message, a convolution encoder for Viterbi or other error correction encoding. The bits may be punctured and mapped to any of a variety of other phase or frequency shift paradigms.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer-useable storage medium for execution by a computer. As an example, an embodiment of a computer program product includes a computer-useable storage medium to store a computer-readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   obtaining channel state information from a receiving device in a wireless network at a transmitting device, the channel state information being received through the wireless network;
   deriving a first set of beam steering vectors based on the channel state information to direct a first radio signal to the receiving device;
   deriving a second set of beam steering vectors based on the channel state information to direct a second radio signal other than to the receiving device, wherein the second set of beam steering vectors is orthogonal to the first set of beam steering vectors;
   generating a perturbation matrix;
   forming a spatial mapping matrix by combining the first and the second set of beam steering vectors with the perturbation matrix;
   pre-coding data symbols to be transmitted to the receiving device using the spatial mapping matrix; and
   transmitting the pre-coded data symbols through the wireless network to the receiving device.

2. The method of claim 1, wherein the channel state information comprises a channel coefficient matrix.

3. The method of claim 2, wherein deriving a set of beam steering vectors comprises applying a singular value decomposition to the channel coefficient matrix.

4. The method of claim 1, further comprising sending a channel state information request to the receiving device and wherein obtaining the channel state information comprises receiving the channel state information as feedback in response to the channel state information request.

5. The method of claim 1, wherein the perturbation matrix is configured as having a scalar selection factor chosen to be zero or one for each perturbation matrix value.

6. The method of claim 1, wherein the perturbation matrix is configured having a scalar power factor for each perturbation matrix value.

7. The method of claim 1, wherein the perturbation matrix values are random numbers within a range from zero to $2\pi$.

8. The method of claim 1, wherein the data symbols are a sequence of data symbols, the method further comprising changing the perturbation matrix values after pre-coding each data symbol of the sequence of data symbols.

9. The method of claim 1, further comprising:
   forming a second spatial mapping matrix by combining the first and the second set of beam steering vectors with a second perturbation matrix;
   pre-coding training symbols to be transmitted to the receiving device using the second spatial mapping matrix; and
   transmitting the pre-coded training symbols through the wireless network to the receiving device.

10. The method of claim 9, wherein the first perturbation matrix is different from the second perturbation matrix.

11. The method of claim 1, further comprises:
    generating noise symbols;
    forming a second spatial mapping matrix using the first and second set of beam steering vectors;
    pre-coding the noise symbols using the second spatial mapping matrix; and
    transmitting the pre-coded noise symbols other than to the receiving device.

12. The method of claim 11, wherein pre-coding the noise symbols further comprises selecting different beam steering vectors of the second set of beam steering vectors after pre-coding each noise symbol.

13. A non-transitory computer-readable medium having instructions stored thereon that when operated on by the computer cause the computer to perform operations comprising:
    obtaining channel state information from a receiving device in a wireless network at a transmitting device, the channel state information being received through the wireless network;
    deriving a first set of beam steering vectors based on the channel state information to direct a first radio signal to the receiving device;
    deriving a second set of beam steering vectors based on the channel state information to direct a second radio signal other than to the receiving device, wherein the second set of beam steering vectors is orthogonal to the first set of beam steering vectors;
    generating a perturbation matrix;
    forming a spatial mapping matrix by combining the first and the second set of beam steering vectors with the perturbation matrix;
    pre-coding data symbols to be transmitted to the receiving device using the spatial mapping matrix; and
    transmitting the pre-coded data symbols through the wireless network to the receiving device.

14. The medium of claim 13, wherein deriving a set of beam steering vectors comprises applying a singular value decomposition to the channel state information in the form of a channel coefficient matrix.

15. The medium of claim 13, wherein the perturbation matrix has a scalar selection factor chosen to be zero or one for each perturbation matrix value and a scalar power factor for each perturbation matrix value.

16. An apparatus comprising:
    a controller to obtain channel state information from a receiving device in a wireless network through the wireless network, to derive a first set of beam steering vectors based on the channel state information to direct a first radio signal to the receiving device, to derive a second set of beam steering vectors based on the channel state information to direct a second radio signal other than to the receiving device, wherein the second set of beam steering vectors is orthogonal to the first set of beam steering vectors, to generate a perturbation matrix, and to form a spatial mapping matrix by combining the first and the second set of beam steering vectors with the perturbation matrix; and
    a transceiver to pre-code data symbols to be transmitted to the receiving device using the spatial mapping matrix, and transmit the pre-coded data symbols through the wireless network to the receiving device.

17. The apparatus of claim 16, wherein the controller is further to form a second spatial mapping matrix by combining the first and the second set of beam steering vectors with a second perturbation matrix and wherein the transceiver is further to pre-code training symbols to be transmitted to the receiving device using the second spatial mapping matrix and transmit the pre-coded training symbols through the wireless network to the receiving device.

18. The apparatus of claim 16, wherein the perturbation matrix has a scalar selection factor chosen to be zero or one for each perturbation matrix value.

19. The apparatus of claim 16, wherein the controller is further to generate noise symbols and form a second spatial mapping matrix using the first and second set of beam steering vectors and wherein the transceiver is further to pre-code the noise symbols using the second spatial mapping matrix and transmit the pre-coded noise symbols other than to the receiving device.

20. The apparatus of claim 19, wherein pre-coding the noise symbols further comprises selecting different beam steering vectors of the second set of beam steering vectors after pre-coding each noise symbol.

* * * * *